United States Patent Office 3,422,255
Patented Jan. 14, 1969

3,422,255
MAXIMUM OCCURRING EVENT DETERMINING APPARATUS
Davey L. Malaby, Rochester, Minn., assignor to International Business Machines Corporation, Armonk, N.Y., a corporation of New York
Filed Sept. 29, 1965, Ser. No. 491,355
U.S. Cl. 235—92                                10 Claims
Int. Cl. G06f 7/38; G06g 7/00

This invention is related to apparatus for determining which re-occurring event of a plurality of re-occurring events has occurred most often over a predetermined period of time and more particularly to such apparatus which makes such determination dynamically in parallel and in a nondestructive manner.

In many instances such as in statistical analysis it is desirable to determine which event of a series of events took place most often. For example, it may be desirable to determine which valve of a plurality of valves was closed most often. A common way of ascertaining this would be to enter a count into a particular counter each time an associated valve was closed or opened. The values in the counters corresponding to the valves would then be compared to determine which counter has the highest count. This comparison can be made in several ways. A simple way to make such a comparison is to add pulses into the counters in parallel whereby all counters are forced to pass through zero and return to their value prior to comparison. The first counter passing through zero is then the counter having the maximum count. While this method preserves the count in the counters, it is time consuming and it does not permit a dynamic determination of which counter is maximum. Of course, other parallel comparing methods are available; however, they become quite complex and expensive particularly when the number of possible events is quite large.

This invention enables a dynamic determination of the event which has occurred a maximum number of times. The operation of the invention is primarily based upon two rules. If the event to be counted corresponds to the event which has occurred a maximum number of times (or if multiple events occur simultaneously and one of them has occurred a maximum number of times), then during this counting period a one is added to all counters except the counter (or counters) recording that event (or events). If the event to be counted is one which has not occurred a maximum number of times (and no other event to be counted at this time is maximum) then during this counting period a one is subtracted from the counter corresponding to the event to be counted. In addition to being able to indicate which event has occurred most often, the invention also provides means for indicating the number of times that event has occurred. The invention is useful for both synchronously and asynchronously occurring events. In one instance the invention has been used in a system for dynamically normalizing the size of characters in a character recognition machine as set forth in U.S. patent application Ser. No. 419,428, filed Dec. 18, 1964, for Character Size Measuring and Normalizing for Character Recognition Systems by D. L. Malaby and assigned to the same assignee of the present invention.

A principal object of this invention is to provide improved apparatus for determining which re-occurring event of a plurality of re-occurring events has occurred most often over a predetermined period of time.

Another object of the invention is to provide apparatus which dynamically determines the particular event of plurality of events which has occurred most often over a predetermined period of time.

Another object of the invention is to provide apparatus for determining the event of a plurality of events occurring most often over a predetermined period of time which is relatively simple and inexpensive.

Still another object of the invention is to provide apparatus for determining the event of a plurality of events occurring most often over a predetermined period of time which can also determine the number of times that particular event has occurred.

The foregoing and other objects, features and advantages of the invention will be apparanet from the following more particular description of a preferred embodiment of the invention as illustrated in the accompanying drawings.

Figure 1:
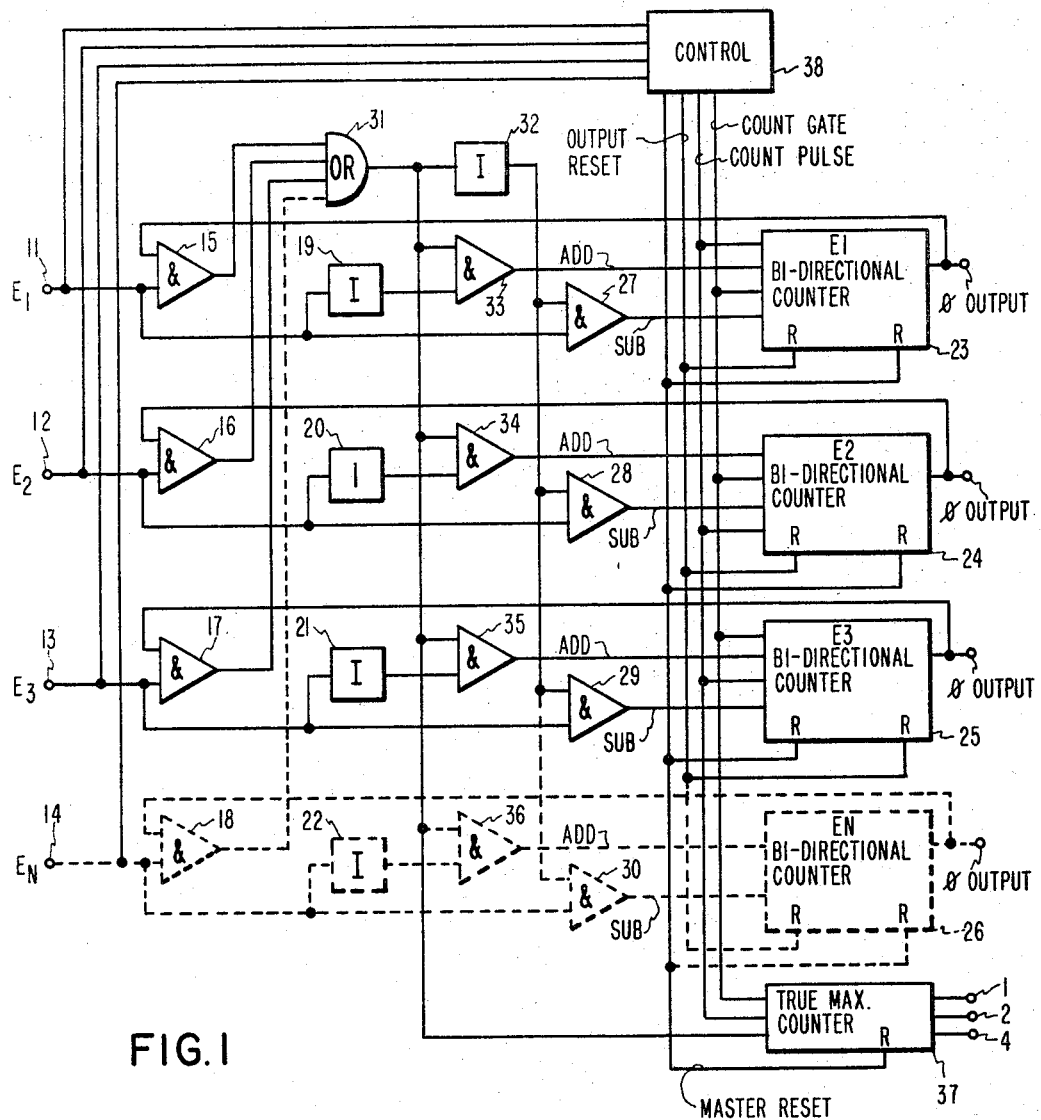
FIG. 1 is a schematic logic diagram of the invention.

With reference to the drawings and particularly to FIG. 1, signals representative of the different events E1, E2, E3 and EN to be counted are applied to terminals 11, 12, 13 and 14 respectively at the time of occurrence. Bidirectional event counters 23, 24, 25 and 26 function to record the occurrence of events E1, E2, E3, and EN, respectively. Each of the counters 23, 24, 25 and 26 has a zero output. When any of these counters is in a 0 condition, this is indicative that its corresponding event has occurred most often. It should be noted that it is possible for more than one event to have occurred most often and thus more than one counter of the counters 23, 24, 25 and 26 can be in the 0 condition at any one time.

Figure 3:
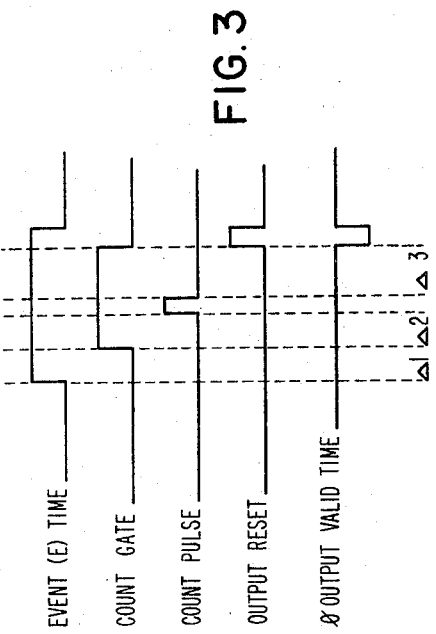
FIG. 3 is a timing diagram.

The input terminals 11, 12, 13 and 14 are connected to inputs of logical AND circuits 15, 16, 17 and 18, respectively; to inputs of inverters 19, 20, 21 and 22, respectively; to inputs of logical AND circuits 27, 28, 29 and 30, respectively; and to inputs of control 38. Logical AND circuits 15, 16, 17 and 18 each have another input connected to the 0 output of counters 23, 24, 25 and 26, respectively. The outputs of these logical AND circuits are connected to inputs of a logical OR circuit 31 which has its output connected to an input of inverter 32, to inputs of logical AND circuits 33, 34, 35 and 36 and to the conditioning input of true maximum counter 37. The output of inverter 32 is connected to counter 37. The output of inverter 32 is connected to inputs of logical AND circuits 27, 28, 29 and 30. Logical AND circuits 33, 34, 35 and 36 also have inputs connected to the outputs of inverters 19, 20, 21 and 22, respectively. Logical AND circuits 33, 34, 35 and 36 control the operation of counters 23, 24, 25 and 26 in an additive mode while logical AND circuits 27, 28, 29 and 30 control these counters in a subtractive mode. Prior to counting any event the counters 23, 24, 25 and 26 are all reset by a Master Reset pulse from control 38. Control 38 provides signals as shown in FIG. 3. These signals include an Event signal which is present at the start of an event and has a duration of sufficient length of time to allow generation of signals for registering or counting the event taking place. The Count Gate signal conditions the counters 23, 24, 25, 26 and 37 for operation and the Count pulse advances or operates these counters. After the end of the Count Gate, the Output Reset pulse is made available for resetting the counters 23, 24, 25 and 26. Control 38 is shown as being responsive upon the occurrence of an event to generate the control signals. This is particularly desirable for asynchronously occurring events. However, it should be recognized that control 38 could operate to furnish the control signals cyclically where the events occur cyclically or in response to some other signal which causes the events to be generated. The construction of control 38 is not particularly important and it can consist of single shot multivibrators and logical devices necessary to generate the above-described signals.

Through the facility of the logic connections just described, the logical AND circuits 27, 28, 29 and 30 will not have an output to control counters 23, 24, 25 and 26 in a subtractive mode, if at the time an event is to be counted, the corresponding bidirectional counter is in the 0 condition. However, all of the logical AND circuits for controlling the bidirectional counters in an additive mode will be conditioned except the one corresponding to the event to be counted. Thus, under the conditions just mentioned a one bit or count pulse is entered into all of the bidirectional counters except the counter corresponding to the event to be counted. On the other hand, if at the time an event is to be counted, its corresponding bidirectional counter is not equal to 0, then each of the logical AND circuits 33, 34, 35 and 36 are inhibited and the counter corresponding to the event occurring is operated in the subtractive mode whereby a one bit is subtracted therefrom. Thus, after a predetermined period of time for detecting the occurrence of the events E1, E2, E3 and EN, the counter or counters which are in the 0 condition will be indicative of the event or events which have occurred a maximum number of times.

In order to provide a true count of the maximum event, counter 37 is provided. It operates under control of an output from logical OR circuit 31. Thus, a count of one is entered into counter 37 only when a count of one is being added to one or more of the counters 23, 24, 25 and 26. Although not shown herein, if it is desired to provide the true count of any of the events, then this can be obtained by subtracting the count in the corresponding bidirectional counter from the value in the counter 37.

Figure 2:
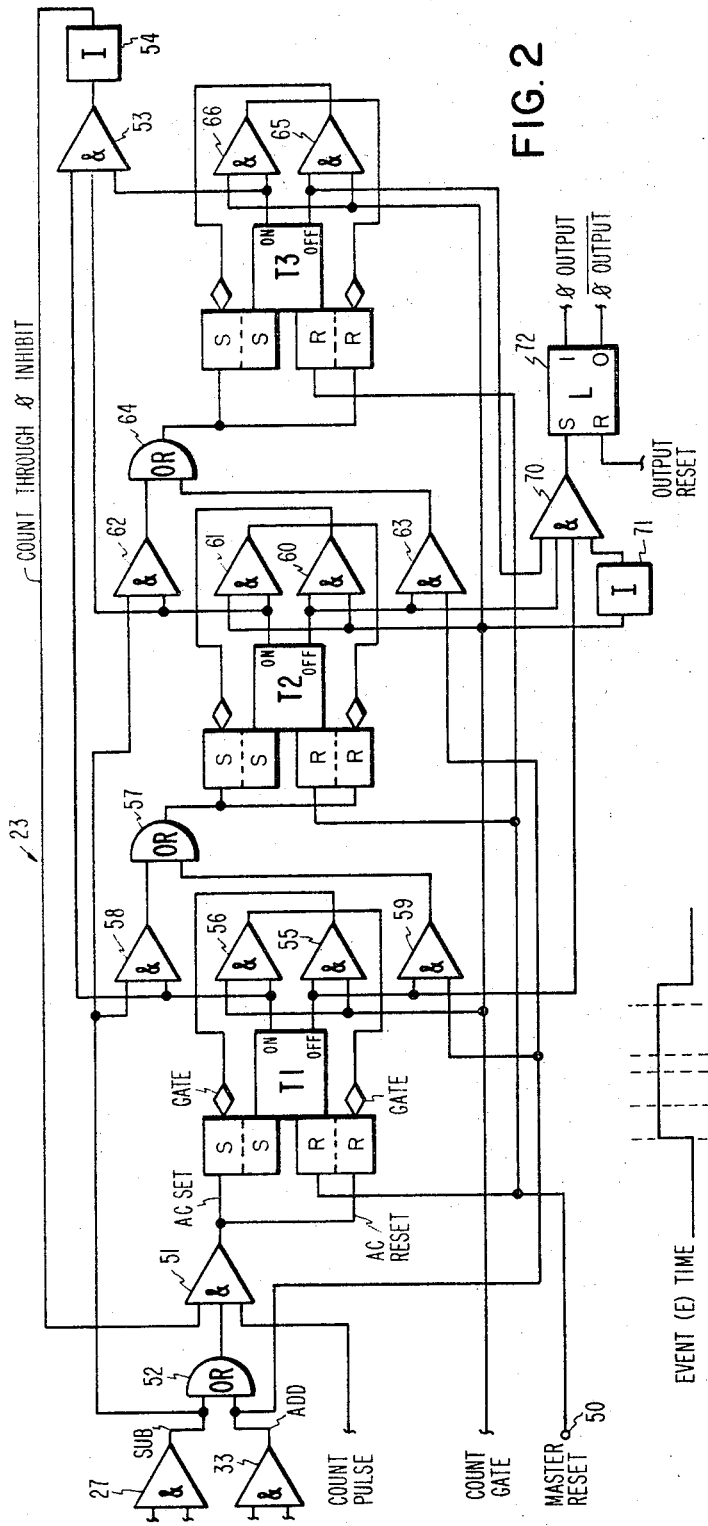
FIG. 2 is a detailed logic diagram of one of the bidirectional counters shown in FIG. 1.

Each of the bidirectional counters 23, 24, 25 and 26 are identical and consequently only the details of one of these bidirectional counters are shown in FIG. 2. For purposes of illustration only, bidirectional counter 23 is shown to consist of three binary triggers T1, T2 and T3. In order to initially reset the counter 23, the DC reset inputs of triggers T1, T2 and T3 are connected to a terminal 50 which is adapted to receive a Master Reset signal from control 38. The AC set and reset inputs of trigger T1 are connected to the output of a logical AND circuit 51. Logical AND circuit 51 has an input connected to control 38 for receiving a Count pulse, an input connected to the output of logical OR circuit 52 and an input connected to the output of an inverter 54. The inputs to logical OR circuit 52 are connected to the outputs of logical AND circuits 27 and 33 for controlling the operation of counter 23 in a subtractive and additive mode respectively. The input of inverter 54 is connected to the output of logical AND circuit 53 which has inputs connected to the set outputs of triggers T1, T2 and T3. By this arrangement a false 0 output condition from counter 23, such as when the counter passes through 0, cannot occur. Logical AND circuits 55 and 56 provide the signals for gating the AC set and reset inputs of T1, respectively. Logical AND circuits 55 and 56 each have an input connected to receive a Count Gate signal from control 38. Logical AND circuit 55 also has an input connected to the reset output of trigger T1 while logical AND circuit 56 has an input connected to the set output of that trigger. The AC set and reset inputs of trigger T2 are connected to the output of a logical OR circuit 57 which has inputs connected to the outputs of logical AND circuits 58 and 59. Logical AND circuit 58 has one input connected to the set output of trigger T1 and another input connected to the output of logical AND circuit 27 which controls counter 23 in a subtractive mode. Logical AND circuit 59 has an input connected to the reset output of trigger T1 and an input connected to the output of logical AND circuit 33 for controlling counter 23 in an additive mode.

The AC set and reset inputs of trigger T2 are conditioned by the outputs of logical AND circuits 60 and 61, respectively. These logical AND circuits function in a manner quite similar to logical AND circuits 55 and 56. Logical AND circuit 60 has an input connected to the reset output of trigger T2 and an input connected to control 38 for receiving the Count Gate signal. Logical AND circuit 61 has an input connected to control 38 to also receive the Count Gate signal and an input connected to the set output of trigger T2. The AC set and reset inputs of trigger T3 are connected to the output of logical OR circuit 64 which has inputs connected to the outputs of logical AND circuits 62 and 63. These logical AND circuits have inputs corresponding to the inputs of logical AND circuits 58 and 59 respectively. The AC set and reset inputs of trigger T3 are conditioned by the outputs of logical AND circuits 65 and 66, respectively. The Count Gate signal from control 38 is applied to both logical AND circuits 65 and 66. Logical AND circuit 65 also has an input connected to the reset output of trigger T3 while logical AND circuit 66 has an input connected to the set output of this trigger.

The just described controls permit counter 23 to count in both an additive and subtractive manner. Further as previously described, logical AND circuit 53 functions to detect when counter 23 passes through 0. Inverter 54 develops an inhibiting signal for logical AND circuit 51 whenever logical AND circuit 53 passes a signal. However, in order to determine when counter 23 is in the 0 state, i.e., all triggers thereof are in the reset condition, logical AND circuit 70 has inputs connected to the reset outputs of triggers T1, T2 and T3. Logical AND circuit 70 also has an input connected to the output of an inverter 71 which has its input connected to control 38 for receiving the Count Gate signal. By this arrangement logical AND circuit 70 is not conditioned during the time the Count Gate signal is present. The output of logical AND circuit 70 is connected to the set input of latch 72. Thus when latch 72 is set, this is indicative of counter 23 being in the 0 state. Latch 72 has its reset input connected to control 38 for receiving an Output Reset pulse which resets the latch 72 as the Count Gate signal turns off.

In the timing diagram of FIG. 3 Δ1 is the delay time necessary for the outputs from the logical AND circuits for controlling the counters in an additive and subtractive mode to reach a steady state. The Count Gate signal is then made available and Δ2 is the delay time necessary to condition the triggers forming the counters. Since the counters are ripple counters, Δ3 is the delay time necessary for each counter to reach a steady state. After Δ3 time the Count Gate is then turned off and this permits the 0 condition of the counter, if present, to set the associated 0 output latch such as latch 72. The Output Reset pulse resets all of the 0 output latches and upon turning off it allows only those counters set at 0 to set their 0 output latches.

*Mode of operation*

As the events E1, E2, E3 and E4 occur either separately or simultaneously, the counters 23, 24, 25 and 26 will either operate in an additive or subtractive mode. These counters are initially reset by the Master Reset signal from control 38. Thus if E1 is the first event to occur, it is passed by logical AND circuit 15 and is also applied to logical AND circut 27 and inverter 19. Logical OR circuit 31 will pass the signal from logical AND circuit 15 to condition logical AND circuits 33, 34, 35 and 36 and the true maximum counter 37. However, since logical OR circuit 31 passes a signal to inverter 32, logical AND circuits 27, 28, 29 and 30 will not be conditioned and, therefore, counters 23, 24, 25 and 26 cannot operate in the subtractive mode. Additionally, in view of the event E1 being applied to terminal 11 an input is available to inverter 19 and thus logical AND circuit 33 is inhibited and, therefore, a Count pulse cannot enter bidirectional counter 23. Since inputs are not available at this time on terminals 12, 13 and 14, logical AND circuits 34, 35 and 36 are conditioned and they provide a conditioning signal to pass the Count pulse into counters 24, 25 and 26, respectively. Thus counters 24, 25 and 26 will each have a count of 1 at this time. Counter 23 is still in the 0 condition.

Asusme that the next event to occur is E2. Although E2 is present on terminal 12, logical AND circuit 16 is not conditioned because counter 24 is not in the 0 state and thus a signal is not available to logical OR circuit 31. Hence, logical AND circuits 33, 34, 35 and 36 and counter 37 are not conditioned. However, logical AND circuits 27, 28, 29 and 30 are conditioned. The event E2 passes from terminal 12 to an input of logical AND circuit 28, and logical AND circuit 28 passes a signal to condition counter 24 to operate in the subtractive mode. When a Count pulse is applied to counter 24 from control 38, it subtracts from the valve in counter 24 thus bringing this counter to the 0 output condition. At this time counters 23 and 24 are both in the 0 output condition, counters 25 and 26 each have a count of 1 and counter 37 has a count of 1. If the next event to occur were again an E2 event, logical AND circuit 16 would pass a signal to logical OR circuit 31 and logical AND circuits 33, 34, 35, 36 and counter 37 would be conditioned. Logical AND circuits 27, 28, 29 and 30 would not be conditioned. Although logical AND circuit 34 is conditioned by the output from logical OR circuit 31 it will not have an output because the signal representing the event E2 is passed to inverter 20. On the other hand, logical AND circuits 33, 35 and 36 will have an output signal to condition counters 23, 25 and 26 to operate in the additive mode. A count of 1 will be entered into these counters and counter 37 as the Count pulse is passed from control 38. Hence at this time Counter 23 will now have a count of 1. Counter 24 is in the 0 state and, therefore, it is indicating a maximum count condition. Counters 25, 26 and 37 each have a count of 2 therein. Therefore, the true maximum count is 2. Further, by subtracting the value in the counters 23, 24, 25 and 26 from the value in counter 37, the true value for each of these counters can be obtained. Thus it is seen that the true values of counters 23, 24, 25 and 26 is 1, 2, 0 and 0, respectively. Further operation would take place in the manner just described.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Maximum occurring event determining apparatus comprising:
 a pair of selectively operable bidirectional counters each corresponding to a particular event;
 means connected to provide a pulse to said counters during the occurrence of an event;
 logic means operable in response to the occurrence of an event and the corresponding counter being in a zero condition for providing an additive control signal and operable in response to the occurrence of an event and the corresponding counter being in a non-zero condition for providing a subtractive control signal; and
 means connected to said logic means and said counters for applying said additive control signal to said counter corresponding to the non-occurring event and applying said subtractive control signal to said counter corresponding to the occurring event.

2. The apparatus of claim 1 further comprising a true maximum counter connected to said logic means and said count pulse providing means to additively receive a count pulse when the same is entered into the counter corresponding to said non-occurring event.

3. Apparatus for determining which event of several events occurs a maximum number of times comprising:
 first and second event counters operable to count bidirectionally;
 first and second settable indicating means connected to said first and second counters, respectively, to be set thereby when the same are in the zero state;
 logic means connected to said first and second indicating means and connected to receive a signal corresponding to the occurrence of an event to provide additive and subtractive control signals, said logic means providing an additive control signal to said second counter and a subtractive control signal to said first counter when the occurring event corresponds to said first counter and said first indicating means is set and not set respectively, and providing an additive control signal to said first counter and a subtractive control signal to said second counter when the occurring event corresponds to said second counter and said second indicating means is set and not set respectively;
 means for providing a count pulse during the occurrence of an event;
 first and second gating means connected to receive said count pulse and to be conditioned by said additive and subtractive control signals and connected to said first and second counters respectively to control the entry of count pulses therein.

4. The apparatus of claim 3 further comprising means for resetting first and second event counters to the zero state prior to the occurrence of any event.

5. The apparatus of claim 3 further comprising means for resetting said first and second indicating means after the occurrence of one event and prior of the occurrence of a subsequent event.

6. The apparatus of claim 3 further comprising a true maximum counter connected to said logic means and said count pulse providing means to additively receive a count pulse when said logic means provides an additive control signal.

7. Apparatus for determining which event of a plurality of events occurs a maximum number of times comprising:
 a plurality of input terminals for receiving signals corresponding to a plurality of possibly occurring events;
 a plurality of bidirectional event counters;
 a plurality of settable indicating means connected to said plurality of counters respectively to be set thereby when the same are in the zero state;
 a plurality of logical AND circuits connected to said plurality of input terminals and the set outputs of said plurality of indicating means and each operable to pass an output signal when signals are simultaneously present from a corresponding input terminal and a corresponding set indicating means;
 a plurality of additive control gates connected to be conditioned whenever any of said plurality of logical AND circuits passes an output and each connected to one terminal of said plurality of input terminals and operable to pass an additive control signal if a signal is absent on the associated input terminal at the time of being conditioned;
 a plurality of subtractive control gates connected to be conditioned whenever all of said plurality of logical AND circuits fail to pass an output signal and each connected to one of said plurality of input terminals and operable to pass a subtractive control signal if a signal is present on the associated input terminal at the time of being conditioned;
 a plurality of means responsive to said additive control signals to control the operation of said plurality of counters in an additive manner;

a plurality of means responsive to said subtractive control signals to control the operation of said plurality of counters in a subtractive manner; and means for supplying a count pulse to said plurality of counters within the occurrence of an event.

8. The apparatus of claim 7 wherein said settable indicating means are latches.

9. The apparatus of claim 8 further comprising means for resetting said latches after a count pulse has been applied to said plurality of counters and prior to the occurrence of another event.

10. The apparatus of claim 7 further comprising a true maximum counter connected to be advanced by a count pulse whenever any of said plurality of logical AND circuits passes a signal.

References Cited

UNITED STATES PATENTS

| | | | |
|---|---|---|---|
| 2,821,696 | 1/1958 | Shiowitz | 340—149 |
| 2,970,759 | 2/1961 | Lanning | 235—92 |
| 3,086,708 | 4/1963 | Berkowitz | 235—92 |
| 3,166,733 | 1/1965 | Schuman | 235—177 |
| 3,257,549 | 6/1966 | Mahro | 235—175 |
| 3,257,550 | 6/1966 | Götz | 235—175 |
| 3,257,551 | 6/1966 | Götz | 235—175 |

MAYNARD R. WILBUR, *Primary Examiner.*

G. J. MAIER, *Assistant Examiner.*